Figure 1:
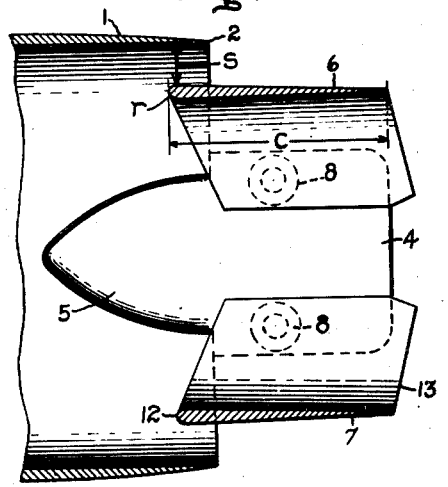

Sept. 6, 1949.  S. NEAL  2,481,330
VARIABLE JET NOZZLE
Filed Aug. 6, 1946  3 Sheets—Sheet 1

Inventor:
Stanford Neal,
by Prowell S. Meek
His Attorney.

Sept. 6, 1949.  S. NEAL  2,481,330
VARIABLE JET NOZZLE
Filed Aug. 6, 1946  3 Sheets-Sheet 2
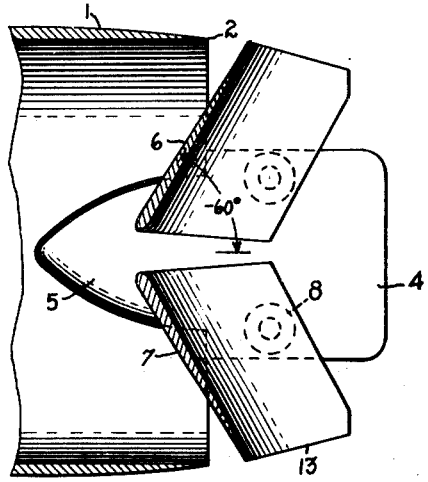
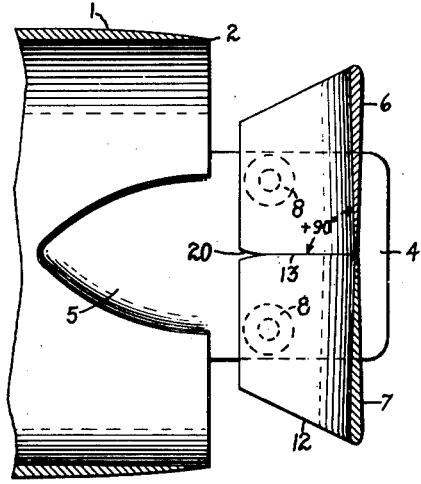
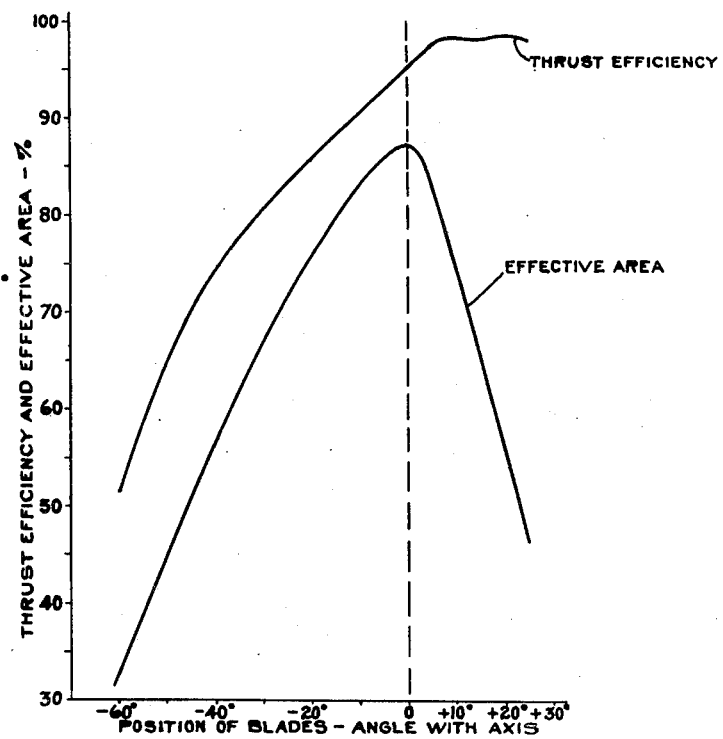
Inventor:
Stanford Neal,
by *Prowell S. Meek*
His Attorney.

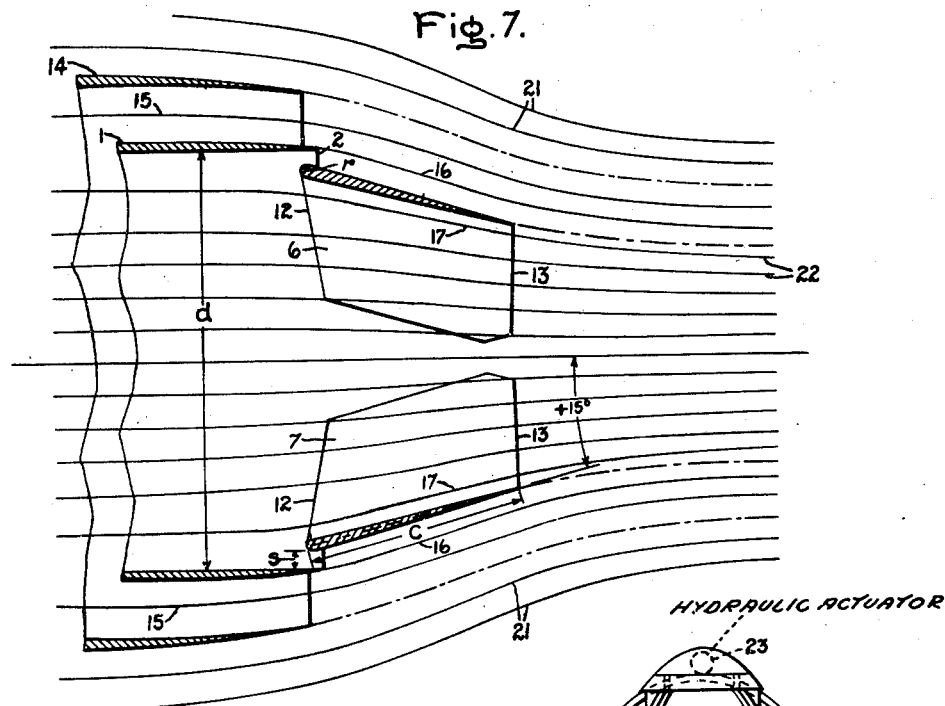
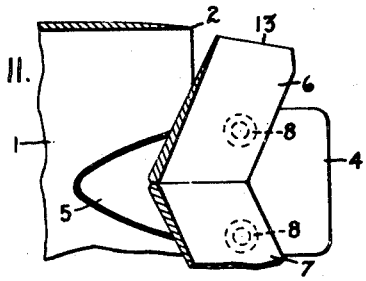
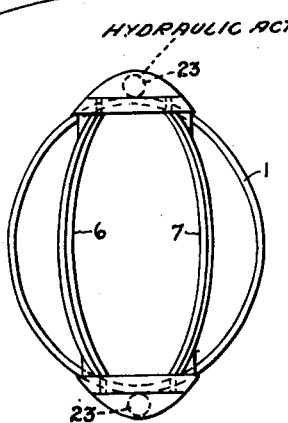
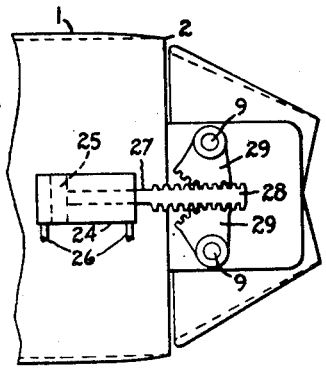
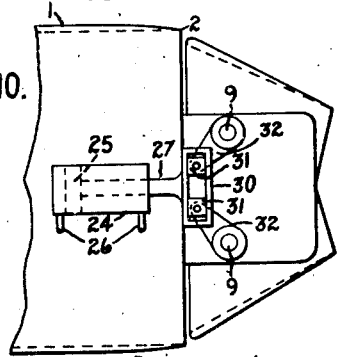

Patented Sept. 6, 1949

2,481,330

UNITED STATES PATENT OFFICE 2,481,330

VARIABLE JET NOZZLE

Stanford Neal, Schenectady, N. Y., assignor to General Electric Company, a corporation of New York Application August 6, 1946, Serial No. 688,733

5 Claims. (Cl. 60—35.5)

My invention relates to a variable area discharge nozzle for producing a high velocity jet of compressible fluid medium, particularly to such nozzles as used to produce thrust in a jet propulsion device. While not necessarily limited thereto, it is especially intended for use in connection with gas turbine powerplants for the jet propulsion of aircraft.

In designing a gas turbine "jet engine" for the propulsion of aircraft, it soon becomes apparent that for a number of reasons it is extremely desirable to be able to readily alter the effective area of the thrust-producing nozzle. In a jet engine having a centrifugal or axial flow compressor, the rate of flow of air through the powerplant, in terms of weight of fluid per unit of time, is a function of the rotational speed of the compressor. Because of the very considerable rotational inertia of the rotor, it is ordinarily impracticable to effect material changes in the weight flow within a short interval of time. Therefore, since the thrust produced by the propulsion jet is a joint function of the weight flow and the velocity of the jet, varying the area of the jet nozzle and thereby altering the jet velocity seems to present the most readily feasible method of quickly changing the thrust.

When jet propulsion gas turbine powerplants are used in military aircraft where performance characteristics such as maneuverability are required in the highest degree, a variable nozzle is especially advantageous in order to effect rapid and material changes in the thrust output. For instance in the case of naval aircraft for carrier-based operation, it is required that a pilot attempting to land on the carrier be able to reduce the thrust to its minimum value when approaching the landing area, without reducing the rotational speed of the powerplant. Then, if he at the last moment receives a signal not to land, the variable nozzle can be very quickly adjusted to again produce maximum thrust, without the time delay required for producing a change in the rotational speed of the turbine powerplant rotor. This situation, where a pilot attempting to land on a carrier ship is suddenly required to resume full power operation and circle for another attempt, is known as the "wave-off condition" and represents one of the most critical situations encountered by an aircraft gas turbine powerplant. The present invention is intended to provide a means for controlling an aircraft propulsion jet nozzle so as to make the gas turbine jet propulsion powerplant more readily adaptable for operation from naval aircraft carriers. It should be understood, however, that the invention also has important advantages in increasing the fuel economy and flexibility of gas turbine powerplants when applied to other types of military and commercial aircraft.

An object of the invention is to provide a variable nozzle of the type described which is simple and strong mechanically, capable of very high aerodynamic efficiency throughout its normal operating range, and is at the same time capable of producing very material changes in the effective area and net thrust produced by the jet.

A further object is to provide an effective variable nozzle which can be controlled quickly with the expenditure of a minimum amount of work.

Another object is to provide a variable jet nozzle which can be readily arranged to deflect all or a major portion of the jet into a direction having a substantial transverse component, so as to perform "jet spoiling" functions for reducing the net thrust in an axial direction to the very lowest value possible.

Still another object is to provide a variable jet nozzle having movable elements so supported that by simple alterations in the design, they can be made to automatically move to either the maximum or minimum area position, as desired, in the event of failure of the actuating mechanism.

Figure 2:
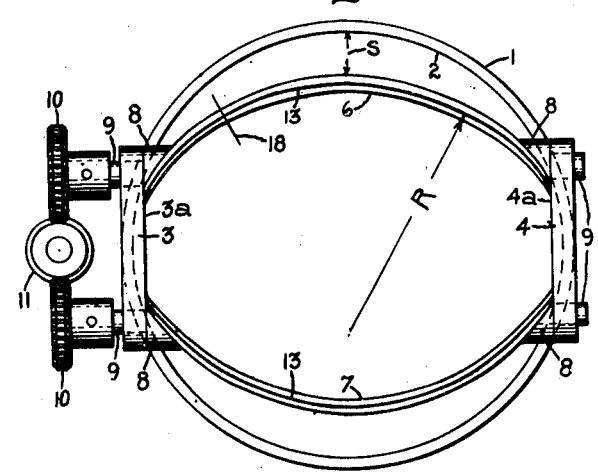
Figure 3:
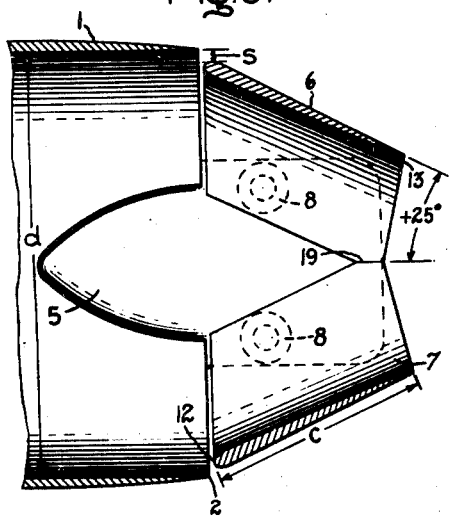
Figure 4:
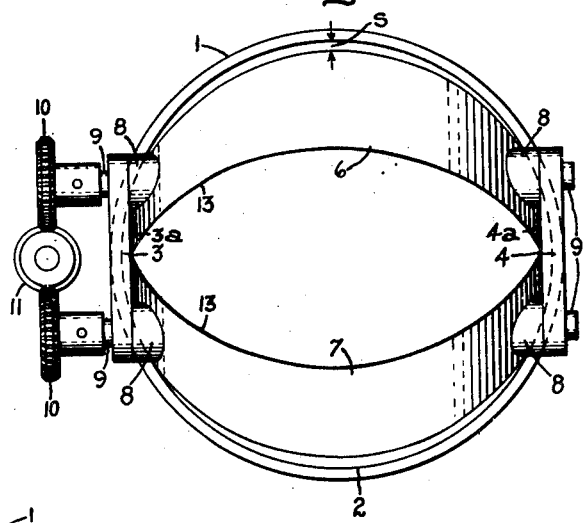
Figure 13:
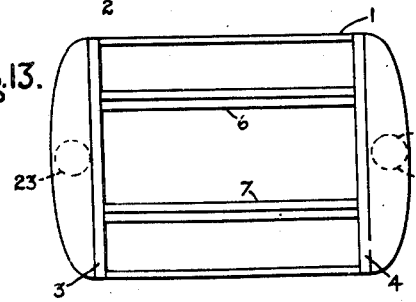

Other objects and advantages will be apparent from the following description taken in connection with the accompanying drawings, in which Fig. 1 represents an axial section through a variable nozzle made in accordance with my invention, in the "neutral" or maximum area position; Fig. 2 is an end view of the nozzle of Fig. 1; Fig. 3 is an axial section showing the nozzle of Fig. 1 in the minimum area position; Fig. 4 is an end view of the nozzle of Fig. 3; Fig. 5 is a sectional view showing the nozzle of Figs. 1 to 4 in the "jet spoiling" position; Fig. 6 is a sectional view of a modification which gives a more efficient jet spoiling action; Fig. 7 is a sectional view of the nozzle of Figs. 1 to 5 in a position intermediate those represented in Figs. 1 and 3 respectively; Fig. 8 is a graphical representation of the performance which may be obtained with variable nozzles made in accordance with the invention; Figs. 9 and 10 are alternate forms of actuating mechanism for positioning the variable elements of the nozzle; Fig. 11 is a further modification of the arrangement of Fig. 5; and Figs. 12 and 13 are still further modifications of the structure of Figs. 1 to 5.

Referring now to Fig. 1, my variable nozzle arrangement is represented as applied to a conduit 1 which may represent the discharge "tailpipe" of an aircraft gas turbine jet propulsion powerplant. Ordinarily this discharge conduit will have an inner surface which is either of straight cylindrical section, or slightly conical so as to contract slightly to the discharge edge 2. This discharge edge 2 will preferably be made to have a very thin section as indicated in the drawing, being perhaps of the order of .025 inches in thickness.

Projecting beyond the discharge edge 2 of the pipe 1 are a pair of diametrically opposed plate members 3 and 4, the plan shape of which is indicated, partly in dotted lines, in Fig. 1. As may be seen more clearly in Fig. 2, members 3 and 4 are provided with plane inner surfaces 3a and 4a respectively, the distance between the planes 3a and 4a being somewhat less than the internal diameter of pipe 1. So that the upstream edges of the plates 3 and 4 will not constitute an eddy producing obstruction to the flow of fluid through the pipe 1, a suitable streamlined fairing indicated at 5 in Fig. 1 may be provided on the inner surface of the pipe, so shaped as to produce a smooth continuous transition from the cylindrical surface of the pipe to the flat surfaces 3a, 4a. In order to secure additional mechanical strength, it may be advisable to form the streamlined fairings 5 as integral portions of the respective plates 3 and 4, in which event the portions 5 may be welded to the inner surface of pipe 1.

As will be seen in Figs. 1 and 2, the plate members 3, 4 serve as supports for a pair of pivoted area-control vanes 6 and 7. These vanes may advantageously be formed as portions of a cylindrical shell in a manner described more particularly hereinafter. As may be seen in Fig. 2, the cylinder from which vanes 6, 7 are formed is of a diameter somewhat larger than the diameter of pipe 1, and the ends of the curved shells 6, 7 are machined so as to have parallel surfaces adapted to fit closely with the plane surfaces 3a, 4a of the support plate members. Located at either end of each of the control vanes, and on the exterior surface thereof, are bosses indicated at 8. Secured in the bosses 8 and projecting through the respective support members 3, 4 are short shafts 9. The shafts 9 may carry, at either or both sides of the nozzle, suitable means for positioning the control vanes. As shown in Fig. 2, the actuating means comprises gears 10, at one side only of the nozzle, engaging a worm gear 11 adapted to be rotated by a suitable motor (not shown) which may be of any suitable electric or hydraulic type. It will be apparent that by appropriate rotation of the worm 11, the vanes 6, 7 may be moved through a range of positions, of which Fig. 3 represents one extreme, Fig. 5 represents the other extreme, and Figs. 1 and 7 are intermediate positions.

In the description herein of the design characteristics of my improved variable jet nozzle, the symbol $d$ will represent the inner diameter of the tailpipe 1 at the discharge edge 2. The symbol $s$ is the radial distance between the inner surface of pipe 1 and the outer surface of the "upstream" or leading edge 12 of the control vanes. The axial length or "chord" of the vanes will be represented by the symbol $c$. The neutral or maximum area position represented by Figs. 1 and 2 shall be considered the "zero degree" position, the mean chord of the vanes being parallel to the axis of the nozzle. The angular displacement when the upper vane 6 rotates clockwise shall be considered the direction of "positive" displacement; while rotation of the vanes in the opposite sense shall be considered "negative" displacement. Thus Fig. 3 represents the "+25° position"; Fig. 5 is the "—60° position"; Fig. 6 is the "+90° position"; and Fig. 7 is the "+15° position."

As noted above, the neutral or zero degree position shown in Figs. 1 and 2 represents the condition which provides the maximum effective area. It may readily be seen from Fig. 2 that this effective area is very nearly equal to the unobstructed inside area of the pipe 1. The vanes 6 and 7 are so designed as to have a minimum thickness consistent with the required mechanical strength and the design criteria described hereinafter, so as to cause the smallest possible obstruction to the flow of the fluid with the vanes in the maximum area position. Similarly the distance between the parallel plane surfaces 3a, 4a of the vane support members 3, 4 is made to approach the inner diameter of pipe 1 as closely as is practicable consistent with mechanical design requirements. I have demonstrated with an engineering sample that the effective area of my variable nozzle may be of the order of 90 per cent of the gross inner diameter of the jet pipe 1, the remaining 10 per cent representing the obstruction introduced by the vanes 6, 7 and the supports 3, 4.

Attention is directed to the fact that by making the radius of the cylindrical shells 6, 7 appreciably greater than the inside radius of the pipe 1, a crescent-shaped opening is defined by the outer surface of the vane and the inner surface of the pipe, with a maximum width indicated by the symbol $s$ in Fig. 2. If the radius of curvature of the vane is made more nearly equal to the radius of the pipe, then this crescent-shaped opening is caused to extend more nearly completely around the circumference of the nozzle. Greater aerodynamic efficiency can be obtained by making the radius of the control vanes appreciably greater than the radius of the pipe, as in the drawings, so that a substantially elliptical area is defined between the vanes, the crescent-shaped openings defined by the outer surface of the vanes and the inner surface of the pipe being of appreciable width throughout the major portion of the crescent with the narrow extreme end portions of the crescents occupied by the shaft bosses 8. Tests have shown that with this arrangement the nozzle efficiency and other characteristics approach very closely to that obtainable with the pipe 1 alone, without the vanes 6, 7 and the support members 3, 4, 5.

In Figs. 3 and 4 the vanes 6 and 7 are shown rotated through a +25° angle relative to the axis of the nozzle so as to form the aluminum discharge area obtainable. In this position the leading edges 12 of the vanes form a very thin crescent-shaped opening with the discharge edge 2 of the pipe while the trailing edges 13 define a substantially elliptical central jet opening, as shown in Fig. 4. Thus it will be seen that as the vanes rotate from the maximum area position of Figs. 1 and 2 to the minimum area condition of Figs. 3 and 4 the jet nozzle openings defined remain substantially similar in cross-sectional shape but become progressively narrower in width. My research has shown that it is readily possible to arrange a nozzle in accordance with my invention so as to provide a maximum discharge area of the order of two times the minimum area.

Fig. 5 indicates how the control vanes may be rotated through a negative angle so as to deflect a portion of the jet to the side and at the same time produce energy-consuming eddies on the downstream side of the vanes, which effectively reduces the net thrust in the axial direction. This position may be referred to as the "jet spoiling" position because of this action in breaking up the jet, lowering the thrust efficiency, destroying the axial velocity component and creating appreciable transverse velocity components. The position shown in Fig. 5 is the "−60° position," and it will be apparent that in this position a very small portion of the fluid is permitted to flow axially through the space defined between the leading edges of the control vanes. The net axial thrust produced by this comparatively small jet is very small, as will be seen from the performance characteristics described hereinafter.

It will be apparent from a consideration of Fig. 5 that by somewhat altering the shape of the leading edges, and perhaps making some accompanying adjustment in the location of the pivots 8, the leading edges may be made to meet when in the "jet spoiling" position as indicated in Fig. 11.

Likewise, by shortening the chord $c$ of the vanes and properly shaping the trailing edges 13, the vanes may be rotated through a positive angle of 90°, so that the trailing edges meet as shown in Fig. 6. With this arrangement there is no axial jet produced, all of the fluid being deflected laterally through the opposed orifices defined by the leading edges 12 and the tailpipe discharge edge 2. While this shortening of the chord of the vanes results in a very slight loss in aerodynamic efficiency when in the "area control position" represented by Figs. 1, 3 and 7, the jet deflecting action is more effective than the spoiling action produced by the longer vanes when rotated to the position of Fig. 5.

Fig. 7 illustrates long type vanes similar to those of Figs. 1 to 5, in the "+15 degree" position. In this view are shown the lines indicating the streamline flow through the central orifice defined by the trailing edges 13 of the control vanes and the two crescent-shaped openings with the maximum width $s$ defined between the leading edges 12 and the discharge edge 2 of the jet pipe. Also indicated in this figure is the arrangement of a shroud 14 through which cooling air may flow as represented by the flow line 15. As will be understood by those familiar with aircraft gas turbine powerplants, the flow 15 may represent the entire engine cooling air flow, or it may be only a small amount of air serving only to cool the jet pipe 1. Fig. 7 will be more specifically referred to in connection with the description of the operation and performance characteristics below.

The method of designing a variable jet nozzle in accordance with my invention will be indicated by the following outline.

For the basic form of my variable nozzle represented in Figs. 1–5, the jet pipe 1 is of round section and has a straight cylindrical inner surface so as to form a circular stream of fluid approaching the nozzle with parallel flow lines. The pipe diameter $d$ is determined by the maximum flow rate of the powerplant with which the nozzle is to be used and the maximum velocities permissible in the jet pipe. Ordinarily it will be preferable to keep this velocity in the neighborhood of 900 feet per second or lower, corresponding to a Mach number of about .5.

The control vanes 6, 7 may be conveniently formed from a cylindrical shell of a thickness at least equal to the maximum vane thickness desired, and with a mean diameter sufficiently greater than the diameter $d$ of the jet pipe to give the vanes a somewhat flattened configuration as represented in Fig. 2. This cylindrical shell is cut on an axial plane into two separate portions and the ends of the respective portions are machined so as to cooperate with the flat surfaces 3a, 4a of the vane support members 3, 4. Because random leakage reduces the aerodynamic efficiency of the nozzle, it is important that the clearance between the ends of the vanes and the support members be as small as possible consistent with the mechanical requirement that there must be no binding over the entire temperature range to be encountered, in order that prohibitive operating forces will not be required. These considerations also dictate that the thickness of the vanes shall be sufficient to make them rigid enough to prevent distortion under the large aerodynamic forces applied to the vanes in operation.

For the zero degree or maximum area position of Figs. 1 and 2, it would be desirable from an aerodynamic standpoint to have vanes with a sharp leading edge as well as a sharp trailing edge and negligible thickness throughout the chord. For the mechanical strength reasons suggested above, this is not feasible; and a well-rounded leading edge is required for aerodynamic reasons, as indicated below.

It will be appreciated by those skilled in the art that the pivoted vanes of my nozzle are analogous to an airfoil operating with a variable "angle of attack," which is of course the angle which the mean chord of a given section of the vane forms with the center-line or axis of the nozzle. For all positive angles of attack, represented by Figs. 3 and 7, it is necessary for good efficiency that the fluid flow over the airfoils without eddies or turbulence, as indicated by the stream-lines in Fig. 7. It is particularly important that the flow follow or "hug" the outer surface of the vanes as indicated by the flow lines 16, without any "boundary layer separation" therefrom. Any such separation will introduce energy-consuming eddies which reduce the efficiency of the nozzle. For negative angles of attack, represented by the flow spoiling position of Fig. 5, it does not matter that there is separation and turbulent eddies on the inner or downstream side of the airfoil, since the purpose of the flow spoiling position is to deliberately destroy the nozzle efficiency and thereby reduce the thrust.

For a given positive angle of attack, the precise radius of curvature $r$ of the leading edge of the airfoil section may be determined by any one of several well-known methods for the analyzing of airfoils (for instance, the so-called "flow potential method" of graphical analysis). These same analytical methods will determine the length of the chord $c$ which must be employed if the stream of air 16 is to follow the outer surface of the airfoil without separation therefrom. It will also be found that the required radius of curvature $r$ and the chord $c$ will be affected by the radial widths $s$ of the stream of fluid 16. For the maximum angle of attack represented in Fig. 3 there will be found certain minimum values for the radius of curvature $r$ and the radial clearance space $s$, as well as a minimum length of chord $c$, which will be required if the flow is to smoothly follow the outer surface of the vanes as represented in Fig. 7. It will of course be understood that these dimensions may be determined by wind-tunnel tests of a model, in which various known visual study techniques may be used to determine the actual pattern of the flow around the airfoil. It will be noted that with a round or elliptical jet pipe the vanes are curved, instead of being flat as in the case of an ordinary aircraft airfoil, and the problem of analyzing the flow graphically is more complex; therefore a "three-dimensional flow potential analysis" should be used for most accurate results.

The trailing edge 13 of the vanes should be made as thin as possible so that the flow 16 around the outer surface of the vanes will meet smoothly the flow indicated by the line 17 along the inner surface of the vanes. It is for the same reason that the discharge edge 2 of the jet pipe should be made very thin.

It may be desirable to make a complete graphical analysis of the flow around the vanes for a number of positions corresponding to an increasing angle of attack. It is also desirable to make analyses for sections of the vane spaced angularly from the mid-section shown in Fig. 1. Such a section at the 45 degree position is indicated at 18 in Fig. 2.

For the minimum area position of Figs. 3 and 4, the maximum positive angle of attack depends upon the minimum area desired, the length of the chord $c$ and the minimum value permissible for the clearance space $s$. The minimum area depends on the characteristics of the powerplant with which the nozzle is to be used as well as the characteristics of the aircraft. It will be apparent from the above description that there is an interrelation between the jet pipe diameter $d$, the radius of curvature $R$ of the cylindrical shell from which the vanes 6, 7 are formed, the angle of attack, the radius of curvature $r$ of the leading edge and the chord $c$ of the vanes, and the width of the clearance space $s$. I have found that by suitable analyses supported by tests, a satisfactory design for a variable nozzle arranged in accordance with my invention can be reached which will produce excellent efficiencies over the entire range of positive angles of attack.

As will be apparent from the drawings, the leading edge 12 of the vanes does not lie in a plane perpendicular to the chord but is cut off at an angle. This angle is so selected that the plane of the leading edge will be parallel to and substantially in the plane of the jet pipe discharge edge 2 when the vanes are in their minimum area position, as in Fig. 3. Likewise it will be seen that the trailing edge 13 lies in a plane forming an acute angle with the chord of the vanes. From an aerodynamic standpoint it would be desirable to have the discharge edge 13 lying in a common plane transverse to the axis of the nozzle for all positive angles of attack. This of course is not possible with vanes arranged as shown in the drawings. Therefore, the plane of the discharge edges 13 is a compromise so selected as to approach the desirable condition as closely as possible throughout the range of positive angles of attack.

As may be seen from Fig. 3, it is also necessary to "tailor" the corners of the vanes at the extremities of the trailing edges so that they will meet as indicated at 19. For the arrangement shown in Fig. 6, it is necessary to reduce the length of the chord $c$ somewhat below that required for best aerodynamic efficiency, and to have the discharge edges 13 lying exactly in a plane perpendicular to the mean chord of the vanes, with the extreme corner rounded off as indicated at 20. Tests have shown that these modifications result in a very slight reduction in aerodynamic efficiency when the vanes are in the "area control positions." However, this decrease in efficiency has been found to be only of the order of one-half to one per cent in the maximum thrust efficiency obtained.

With the shape of the inlet and trailing edges dictated by the above considerations, it will usually result that the chord $c$ is not constant but decreases from the mid-section toward either extremity of the vane. This is a further reason why it is important to make analyses for other sections of the vane in addition to the mid-section to check the aerodynamic performance completely. The maximum thickness of the vane adjacent the leading edge, is preferably constant across the span of the vane in order to obtain the mechanical strength and stiffness required.

While in the drawings I have shown the vane section as being symmetrical about the mean chord, it should be understood that the section may also have any suitable non-symmetrical airfoil section which may be indicated to be desirable by the aerodynamic analysis. However, it has been found that the symmetrical section shown in the drawings constitutes a good practical compromise between the many interrelated design factors which must be considered.

The location of the vane-supporting pivots 8 is of considerable importance from the standpoint of the operating forces required of the actuating mechanism. By proper location of the pivots, it is possible to make the vanes move automatically to either extreme position as desired, under the influence of the aerodynamic forces acting on the vanes, in the event of failure of the actuating mechanism. For instance, in military aircraft it may be desirable to have the vanes move to their minimum area or maximum thrust position as shown in Fig. 3 in the event of mechanical failure of the actuating device. Then if combat damage renders the actuator inoperative, the pilot will still have maximum thrust available. In certain other applications it may be preferable to have the vanes move to the maximum area position of Fig. 1 in the event of failure of the actuating mechanism. With my invention either of these methods of operation are readily obtainable by proper location of the pivots 8, as follows.

It will be appreciated by those familiar with airfoil analysis that the aerodynamic forces on a given section may be considered as a single resultant force represented by a vector acting on the airfoil at the center of pressure. It is readily possible by analysis, and/or simple wind-tunnel tests, to determine the shifting of the center of pressure as the angle of attack changes, as well as the range of movement of the resultant force vector. Having given this information, the location of the pivots necessary to produce the desired result is readily ascertained.

Because of the very large forces acting on the vanes, it may be most desirable to reduce to an absolute minimum the work required of the actuating mechanism. This may be accomplished by locating the pivots 8 so that the axis of rotation is in the middle of the range of movement of the resultant force vector. Thus for neither extreme position of the vane will the vector be very far displaced from the axis of rotation, and therefore the turning moment on the vane will be a minimum. Alternatively, the pivots may be so located as to be just outside the range of movement of the resultant force vector, so that for all positions of the vane there will be a net turning moment tending to cause the vane to rotate in the desired direction in the event of failure of the actuator. By locating the pivots so that the axis of rotation is just outside the other extreme of the range of movement of the resultant force vector, the vanes can be caused to rotate in the opposite sense in the event of mechanical failure of the actuating means.

With further reference to the flow pattern produced by my nozzle, it should be noted that in the maximum area position of Figs. 1 and 2, the elliptical jet formed between the curved vanes 6 and 7, as well as the crescent-shaped jets formed by the clearance spaces s, all have substantially parallel flow lines, these three separate jet portions smoothly meeting at the trailing edges 13 of the vanes to form a substantially uniform jet of circular cross-section. With a jet pipe 1 of straight cylindrical section there will be no "vena contracta" and the effective cross-section of the jet produced will be substantially equal in size and shape to the inner configuration of the pipe 1. On the other hand, when the vanes are in a position corresponding to a positive angle of attack, the nozzle has more nearly the characteristics of a conical contracting nozzle and produces a jet which does have a definite vena contracta (as may be seen in Fig. 7) and is of substantially flattened or elliptical cross-section. It is to be noted that propulsion jets of circular or elliptical cross-section appear to have the best aerodynamic efficiency. In Fig. 7 it will also be seen how the ambient air-stream represented by the flow lines 21 merges smoothly with the circumferential sheath of cooling air 15 and the jet discharge represented by lines 16 and 22. It will be obvious that where it is found desirable to omit the cooling air shroud 14, the air stream 21 will flow over the outside of the jet pipe 1 and merge directly with the flow 16.

While in Figs. 1–4, I have shown one type of actuator for positioning the vanes, it will be obvious that many other devices could be used. For instance, Fig. 9 represents actuating means consisting of a hydraulic cylinder 24 containing a piston 25 to the opposite sides of which motive fluid may be admitted through the hydraulic lines 26. Connected to the piston rod 27 is a rack member 28 having teeth engaging gear sectors 29 secured to the shafts 9. In Fig. 10, the piston rod 27 of the hydraulic motor carries a member 30 having a transverse slot in which are slidably arranged a pair of cross-heads 31, respectively pivoted to actuating arms 32 connected to the shafts 9. Many other arrangements of actuating mechanism can also be used, and the specific details are not material to the present invention.

While Figs. 2 and 4 represent the tailpipe 1 as being circular in cross-section, it is to be noted that my variable nozzle arrangement is also applicable to tailpipes of somewhat flattened or elliptical cross-section. The end view of such an arrangement is shown in Fig. 12. With the elliptical tailpipe 1, it is necessary to flatten the area control vanes 6, 7 to a greater extent than shown in Fig. 2; however, the design considerations described above apply equally well to this form of the invention. This arrangement is particularly well adapted for use in connection with the end of a powerplant nacelle or aircraft fuselage having a substantially elliptical cross-section. Fig. 12 also indicates how small hydraulic actuating cylinders 23 may be located in the respective end portions of the elliptical nacelle cross-section. By using two small hydraulic actuators 23 at either side of the nacelle, instead of a single actuating mechanism at one side only (as in Fig. 2), the size of the actuating mechanism can be reduced so as to fit more easily into the space available; and the stress distribution in the vanes 6, 7 can be made more uniform. With a nozzle arranged as in Fig. 12, the actuating mechanism illustrated in Figs. 9 and 10 may readily be employed.

Fig. 13 indicates how the sides of the tailpipe 1 and the area control vanes 6, 7 may be flattened completely, so that the tailpipe becomes rectangular or square in cross-section, and the vanes are simple flat airfoils. While this arrangement is feasible, I have found that a round or elliptical tailpipe with curved vanes as described above is more desirable both from the standpoint of mechanical strength and stiffness and from the standpoint of aerodynamic efficiency.

In considering the performance characteristics of my variable area nozzle the following general principles may be noted. The aerodynamic efficiency of such a nozzle may be designated by a "velocity coefficient," defined as the actual mean velocity of the jet divided by the theoretical velocity obtainable with a perfect nozzle having no aerodynamic losses, that is, one which converts pressure energy into velocity energy with 100 per cent efficiency.

The theoretical "static thrust," which is the reaction force exerted on a nozzle which is stationary with respect to the ambient fluid into which the jet is discharged, is equal to $wv/g$, where $w$ is the actual measured rate of flow in pounds per unit time, $v$ is the calculated theoretical velocity obtainable with a perfect nozzle, and $g$ is the acceleration of gravity. It can be shown that the velocity coefficient is equal to the actual thrust produced on the nozzle divided by the theoretical thrust which would be obtained with a perfect nozzle. Thus, the velocity coefficient can be considered to represent the "thrust efficiency." It will therefore be seen that the velocity coefficient is the most important criterion of the aerodynamic performance of the nozzle.

The "pressure ratio" is the total or impact pressure immediately upstream from the nozzle divided by the static pressure of the ambient fluid into which the jet is discharged. It may be noted that for air or the mixture of hot gases discharged from a gas turbine powerplant, the "critical pressure ratio" is in the neighborhood of 1.89.

Fig. 8 illustrates the performance of which nozzles arranged in accordance with my invention are capable. The abscissa represents the position of the vanes in terms of the angle which the mean chord makes with the axis of the nozzle, that is, the "angle of attack." As indicated above, negative angles represent positions as represented in Fig. 5, while positive angles represent rotation of the vanes from the zero position as represented in Fig. 3. The ordinate represents the thrust efficiency, in per cent of that theoretically obtainable, and effective area, in per cent of the gross tailpipe area.

As will be seen from the thrust efficiency curve, in the jet spoiling position of Fig. 5 (—60° position) the thrust efficiency is reduced to approximately 50 per cent. As the negative angle of attack rises to zero, the thrust efficiency increases rapidly to about 95 per cent for the neutral or zero angle position. For positive angles of attack the thrust efficiency rises rapidly to the neighborhood of 98 per cent, at about a +10° angle of attack, and thereafter remains substantially constant as the angle of attack increases to the maximum represented in Fig. 3 (+25° position).

The precise shape and location of the thrust efficiency curve will vary slightly as the pressure ratio across the nozzle changes. The thrust efficiency curve of Fig. 8 is actually a composite curve based on a considerable number of tests made at various pressure ratios. The highest portion of the curve, for the positive angles of attack between 10° and 25°, was found to shift over a range of about one per cent as the pressure ratio was changed from 1.15 to 2.2.

As will be seen from the thrust efficiency curve of Fig. 8, the aerodynamic efficiency obtained compares very favorably with the performance of a plain nozzle having no area control means. Tests of nozzles made in accordance with the invention indicate that the loss in efficiency due to the area varying mechanism is only of the order of 1½ or 2 per cent. This is a comparatively small price to pay for the important benefits resulting from the ability to materially and quickly alter the effective area and net thrust of a jet propulsion nozzle.

With the "short-vane type" represented in Fig. 6, the "jet spoiling action" has been found to be appreciably more effective, the thrust efficiency dropping to a minimum in the neighborhood of 40 per cent. However, as noted above, reducing the chord length results in a slightly poorer aerodynamic efficiency.

Also shown in Fig. 8 is the variation of the effective area of the nozzle as a function of angle of attack. Because of the extreme difficulty of measuring geometrically the cross-sectional area of the flow path through the nozzle, the values used in determining the curve were calculated from actual tests of the nozzle. The curve represents the effective area as a percentage of the gross cross-sectional area of the jet pipe of internal diameter $d$, neglecting the presence of the area control vanes and the members which support them.

Attention is directed to the fact that for both negative and positive angles of attack, the effective area approaches rather closely a linear function of the angular position of the vanes. This facilitates the design of the control mechanism for the vanes; since a given increment of rotational displacement of the vanes produces substantially the same change of effective area in all portions of the operating range.

It will be seen that my invention provides a variable area thrust nozzle which employs a minimum number of comparatively simple movable members, yet is capable of effecting a very material change in the thrust output of a nozzle with excellent aerodynamic efficiency throughout the normal operating range. My invention also provides effective means for reducing the jet thrust to a minimum value, which change can be effected in a very short time interval. By minor changes in the design of nozzles made in accordance with my invention, the operating force required can be reduced to a comparatively small value, and the area control means can be made to "fail safe" to either the minimum or maximum area position, as desired.

What I claim as new and desire to secure by Letters Patent of the United States, is:

1. A variable fluid nozzle for the jet propulsion of aircraft comprising a jet pipe having an outer surface shaped so as to be surrounded during operation by fluid flowing smoothly at high velocities in a substantially axial direction with no radially outward velocity components, said jet pipe having an end portion terminating at comparatively thin diametrically opposed discharge edge portions lying in a plane substantially normal to the axis of the pipe, a pair of airfoil-shaped vanes adapted to be positioned with their mean chords substantially parallel in a neutral position, and means pivotally supporting said vanes for positioning through positive angles of attack from said neutral position about spaced parallel transverse axes, said axes being spaced axially downstream from the plane of the discharge edge portions and intermediate the leading and trailing edges of the vanes, the size and contour of the vanes being such that they may be positioned with the leading edges defining a pre-determined minimum clearance space with the discharge edge portions and the trailing edges of the vanes defining a jet orifice of reduced effective area, the radius of curvature of the leading edge of said vanes and the length of the chord being so related to the angle of attack and said minimum clearance space that the fluid flow over the exterior surface of the pipe merges smoothly with the flow through the clearance space to effect substantially streamline flow over the exterior surface of the vanes without substantial boundary layer separation therefrom when in the position of maximum angle of attack, and means for moving the vanes to positive angles of attack.

2. A variable fluid nozzle in accordance with claim 1 in which the axes of rotation of the vanes are so located relative to the resultant aerodynamic forces on the vanes that the vanes are substantially balanced for all positive angles of attack.

3. A variable fluid nozzle in accordance with claim 1 in which the axes of rotation of the vanes are located outside the range of movement of the resultant aerodynamic forces on the vanes whereby automatic positioning of the vanes is effected in the event of failure of the positioning means.

4. A variable fluid nozzle comprising a jet pipe having an end portion forming a discharge edge lying substantially in a plane normal to the axis of the pipe, a pair of diametrically spaced members projecting axially downstream from said discharge edge and defining opposed plane surfaces parallel to the axis of the nozzle and spaced apart a distance less than the inner diameter of the pipe, a pair of airfoil vanes arranged between said members and adapted to be positioned with their mean chords substantially parallel in the maximum area position, said vanes being formed as portions of a substantially cylindrical shell of a mean diameter greater than the distance between said plane surfaces, and means pivotally supporting the vanes for positioning through positive angles of attack about parallel spaced transverse axes, said axes being normal to said plane surfaces and lying in a common transverse plane spaced axially downstream from said discharge edge, whereby the vanes can be positioned with their trailing edges cooperating to define a discharge orifice of reduced effective area, the configuration of the vanes and location of the axes of rotation being so related to the discharge edge of the pipe that for the maximum angle of attack the leading edges of the vanes lie substantially in the plane of said discharge edge and form a predetermined minimum clearance space therewith.

5. A variable fluid nozzle comprising a jet pipe having an end portion forming a discharge edge lying substantially in a plane normal to the axis of the pipe, a pair of diametrically spaced members projecting axially downstream from said discharge edge and defining opposed plane surfaces parallel to the axis of the nozzle and spaced apart a distance less than the inner diameter of the pipe, a pair of airfoil vanes arranged between said members and adapted to be positioned with their mean chords substantially parallel in the maximum area position, said vanes being formed as portions of a substantially cylindrical shell of a mean diameter greater than the distance between said plane surfaces, and means pivotally supporting the vanes for rotation through limited angles about parallel spaced transverse axes, said axes being normal to said plane surfaces and lying in a common transverse plane axially spaced downstream from said discharge edge, whereby the vanes can be positioned through positive angles of attack with their trailing edges cooperating to define a discharge orifice of reduced effective area, the configuration of the vanes and location of the axes of rotation being so related to the discharge edge of the pipe that for the maximum angles of attack the leading edges of the vanes lie in substantially the plane of, and form a predetermined clearance space with, said discharge edge, and the trailing edges of the vanes lie in substantially a common plane normal to the axis of the nozzle.

STANFORD NEAL.

REFERENCES CITED

The following references are of record in the file of this patent:

UNITED STATES PATENTS

| Number | Name | Date |
|---|---|---|
| 1,344,518 | Rees | June 22, 1920 |

FOREIGN PATENTS

| Number | Country | Date |
|---|---|---|
| 103,325 | Great Britain | Jan. 19, 1917 |

OTHER REFERENCES

Aircraft Engineering, issue of February 1946, page 55.